United States Patent [19]

Westall et al.

[11] 3,802,896

[45] Apr. 9, 1974

[54] COLOR CONCENTRATED BASE DISPERSION USED IN TABLET FILM COATING

[75] Inventors: Edward B. Westall, San Jacinto; Kenneth C. Pimbley, Garden Grove, both of Calif.

[73] Assignee: Nutrilite Products, Inc., Buena Park, Calif.

[22] Filed: May 15, 1972

[21] Appl. No.: 253,587

[52] U.S. Cl. ............ 106/193 D, 106/24, 106/154 Z, 106/193 J, 106/248, 106/308 Q, 106/308 F, 260/41 R, 260/41 C
[51] Int. Cl. ........................ C08b 27/14, C08h 7/14
[58] Field of Search..... 106/13 T, 308 F, 24, 154 Z, 106/152, 143; 424/36

[56] References Cited
UNITED STATES PATENTS

| 2,366,970 | 1/1945 | Kroeger et al. | 106/154 Z |
|---|---|---|---|
| 2,948,626 | 8/1960 | Sanders | 106/152 |
| 2,185,110 | 12/1939 | Coleman | 106/24 |
| 3,022,185 | 2/1962 | Delfosse | 106/308 Q |
| 3,576,663 | 4/1971 | Signorino | 429/36 |
| 3,030,273 | 4/1962 | Zagnoli | 424/32 |
| 3,244,596 | 4/1966 | Lach | 424/38 |

*Primary Examiner*—Theodore Morris
*Attorney, Agent, or Firm*—Burns, Doane, Swecker & Mathis

[57] ABSTRACT

An improved color concentrated base dispersion adapted to form a film coating mixture is disclosed. The color concentrated base dispersion contains a pigment, dye (optional) and at least one plasticizer adapted to affect the disintegration time of the final coating in a co-solvent mixture of water and a lower alkanol. The color concentrated base dispersion is diluted with a film-forming solution of zein in a lower alkanol (and optionally a small amount of water) to form a film coating mixture. A mixture of plasticizers having different moisture resistance may be utilized to vary the moisture resistance (and therefore the disintegration time) of the coating.

10 Claims, No Drawings

COLOR CONCENTRATED BASE DISPERSION USED IN TABLET FILM COATING

BACKGROUND OF THE INVENTION

Thin films (e.g. less than about 0.1 millimeters) or coatings of suitable film-forming materials are often highly desirable in the preparation of tablets such as pharmaceutical tablets. Often, the base material of the tablet is reactive with water or degradeable by light. The base material may have an unpleasant taste, odor or other characteristic which should be masked or disguised. Also, it may be desirable to retard or inhibit the release of the active (base) material until a particular time after ingestion. A suitable layer must therefore be provided which will disintegrate at the particular time.

High purity zein such as advantageously produced by the process shown in U.S. Pat. No. 3,535,305, is a desirable film-forming or coating material. Zein has a low water solubility and an exceptionally light color which pigments and/or dyes readily. Film coating mixtures can be prepared by mixing the appropriate amounts of zein, pigment, dye and other ingredients in a suitable solvent such as ethyl alcohol and coating (as by spraying) medicinal tablets or the like.

While such film coating mixtures are generally effective to form thin film coatings, their bulk makes them expensive to transport. The film coating mixtures are thus usually made at the time and site of coating which necessitates the maintenance of large numbers of chemicals and extensive mixing apparatus by the coater.

It has heretofore been suggested to form concentrated dispersions of at least some film coating mixture ingredients. For example, U.S. Pat. No. 3,390,049 discloses forming a concentrated solution of shellac, plasticizer, ammonia and water which may be diluted with dye- or pigment-containing organic solvents to form a coating mixture. U.S. Pat. No. 3,149,039 similarly discloses forming a first solution of a film-former (polyethylene glycol) and plasticizer(s) in alcohol. The first solution is diluted with a second solution of mastic in alcohol to provide the composite coating solution which may be appropriately dyed. U.S. Pat. No. 2,925,365 discloses the preparation of a stock aqueous suspension of a dye, pigment and suspending agent. The stock suspension may be diluted prior to use with a coating solution containing acacia, gelatin and glucose.

While these concentrated solutions which may be diluted prior to use have certain obvious advantages, they also have certain disadvantages. For example, it is well-known that shellac (such as disclosed in U.S. Pat. No. 3,390,049) will further polymerize upon aging and, as a result, the drying time of the shellac itself is increased. Also, the disintegration time of the coated tablet is increased. The film coating solution of the said U.S. Pat. No. 3,390,049 patent has a low (less than 6.5 percent) content of coating solids and includes chloroform as a co-solvent. Since chloroform fumes are highly toxic, special handling and/or exhaust systems are necessary during mixing.

Zein film coatings provide a lower degree of oxygen and moisture vapor transmission than polyethylene glycols and therefore provide better tablet protection and stability—particularly when hygroscopic ingredients or materials are used in the tablet core that could physically or chemically react with moisture or undesirable environmental conditions. Zein also gives better protection against unpleasant odor or tastes from the tablet core as compared to polyethylene glycols.

Zein film coatings also provide substantial economies in the overall tablet coating process. For example, the sugar coating of tablets such as shown in the aforesaid U.S. Pat. No. 2,925,365, generally takes from about one to about three days. The present invention advantageously utilizes a color concentrated base dispersion for use with zein as the film-forming material in an operation which requires only a few hours.

It is an object of this invention to provide a new color concentrated base dispersion adapted to provide a film coating mixture for the thin film coating of edible or ingestible materials.

It is another object of this invention to provide a color concentrated base dispersion having a long shelf life and excellent transportability characteristics which dispersion can easily be formed into a thin film coating mixture.

It is still another object of this invention to provide a color concentrated base dispersion and process of forming a coating mixture using the dispersion which mixture possesses controllable desirable tablet coating properties.

It is also an object of this invention to provide a color concentrated base dispersion that is relatively inexpensive and simple to produce and which is readily dilutable to form a thin film coating mixture.

SUMMARY OF THE INVENTION

These and other objects of the invention are provided by a color concentrated base dispersion adapted to be diluted with a zein solution to form a tablet coating mixture which color concentrated base dispersion comprises:

from about 5 to about 70 percent by weight of an edible pigment;

up to about 12 percent by weight of an edible dye;

from about 5 to about 50 percent by weight of at least one plasticizer for zein adapted to affect a desired disintegration time of the coating; and from about 25 to about 60 percent by weight of a co-solvent mixture of from about 20 to about 95 percent by weight of the co-solvent mixture of water and from about 5 to about 80 percent by weight of the co-solvent mixture of a lower alkanol.

In another aspect, these and other objects of the invention are provided by a method of forming a coating mixture adapted to coat tablets with coatings of a particular disintegration time which comprises:

providing a film-forming solution of from about 5 to about 30 percent by weight of zein in from about 70 to about 95 percent by weight of a lower alkanol solvent; and mixing from about 60 to about 95 percent by weight of the total mixture of the said film-forming solution with from about 5 to about 40 percent by weight of the color concentrated base dispersion as set forth above to form a coating mixture.

DETAILED DESCRIPTION OF THE INVENTION

The color concentrated base dispersion of the present invention includes a pigment and/or coloring agent and at least one plasticizer for the zein film-forming material in a co-solvent mixture of water and a lower alkanol.

The co-solvent mixture of water and lower alkanol can be present in the color concentrated base dispersion in amounts of from about 25 to about 60, preferably from about 30 to about 50, percent by weight of the color concentrated base dispersion.

The water and lower alkanol are preferably premixed in amounts of from about 5 to about 80, preferably from about 15 to about 60, weight percent alkanol and from about 20 to about 95, preferably from about 40 to about 85, weight percent water. The lower alkanol can be any monohydroxy alcohol containing up to about 8 carbon atoms of United States Pharmacopoeia (U.S.P.) grade, preferably containing from about 1 to 3 carbon atoms. Ethyl alcohol is preferred.

The pigment can be present in the color concentrated base dispersion in an amount of from about 5 to about 70, preferably from about 15 to about 50, weight percent of the base. Among the pigments useful in the invention are those permitted for food and drug use such as titanium dioxide (U.S.P.) and carbon black. Titanium dioxide, the preferred pigment, provides a white color which is often desirable as the final color of the coated tablet. Also, the white base color provided by titanium dioxide accepts other colors readily.

Colors which may be incorporated into the present invention include the water-soluble, food and drug certified dyes such as FD&C Blue No. 1, FD&C Blue No. 2, FD&C Red No. 2, FD&C Red No. 3, FD&C Red No. 40, FD&C Yellow No. 5, FD&C Yellow No. 6, FD&C Violet No. 1 and FD&C Green No. 3.

Natural colors useful in this invention and permitted for food and drug use include caramel, annatto, cochineal, carotenoids, beet powder, fruit juice, vegetable juice, grape skin extract, paprika, saffron and carmine.

Dyes or colors may be included in the color concentrated base dispersion in an amount of up to about 12 percent by weight of the dispersion, often from about 0.2 to about 10 percent by weight of the dispersion.

The color concentrated base dispersion contains at least one plasticizer for the zein film-forming material adapted to affect the disintegration time of the coating. The plasticizer (or mixture of plasticizers) will generally be present in an amount of from about 5 to about 50, preferably from about 20 to about 40, percent by weight of the color concentrated base dispersion.

Suitable plasticizers include polyethylene glycol and oleic acid. The polyethylene glycol plasticizers of the present invention are solid, waxy materials having molecular weights as high as 20,000. Preferred polyethylene glycols employed have a molecular weight of from about 1,000 to about 10,000. These solid polymers are well-known in the art and are sold under the tradename Carbowax. Polyethylene glycol is not only a plasticizer but also a secondary film-former. Also, being water-soluble, polyethylene glycol lowers the water resistance of the film coating.

Other suitable water-soluble plasticizers which may be included with or in place of the polyethylene glycols include the polypropylene glycols, glycerin, polyvinylpyrrolidone, hydroxyethyl cellulose, carboxymethylcellulose and hydroxypropyl cellulose ether.

Oleic acid is a co-solvent for the zein as well as a plasticizer. Also, oleic acid provides a high degree of moisture resistance. Other suitable water-insoluble plasticizers which may be included with or in place of the oleic acid include stearic acid, sorbitan monooleates and monostearates, diglycerides from the glycerolysis of edible fats and of fat-forming fatty acids, annatto in oil, triacetin and tributyrin.

Careful control of the amounts of polyethylene glycol and oleic acid allows the preparation of tablets of a predetermined moisture resistance and therefore a predetermined disintegration time. For example, for a zein coating with a high degree of moisture resistance and an extended disintegration time, the color concentrated base dispersion may contain essentially only oleic acid plasticizer. A zein coating with a low degree of moisture resistance and a fast disintegration time may be formed from a color concentrated base dispersion containing essentially only polyethylene glycol plasticizer.

A mixture of plasticizer materials will generally be used and the ratio of oleic acid and polyethylene glycol may be varied to control the disintegration time or the degree of moisture resistance in accordance with consumer requirements.

The color concentrated base dispersion may contain minor amounts of other ingredients. For example, polyvinylpyrrolidone is a water-soluble film-forming material which is also soluble in aqueous alcohol solutions. The inclusion of polyvinylpyrrlidone in quantities of from about 1 to about 30, preferably from about 2 to about 20, percent by weight of the color concentrated base dispersion lowers the moisture resistance and decreases the disintegration time of the coating thus providing further control over disintegration time. Also, polyvinyl-pyrrolidone is an effective dispersing agent for titanium dioxide.

Other water-soluble polymeric materials which may be used, as disintegration time control materials include hydroxypropyl cellulose, carboxymethyl cellulose, methylcellulose or the water-soluble salts thereof. Polyvinylpyrrolidone is the preferred disintegration time control material.

Dye solubility additives, such as glycerin, may optionally be added to the color concentrated base dispersion in minor amounts sufficient to increase the solubility of the dye (e.g., from about 0.2 to about 12 percent by weight of the color concentrated base dispersion).

The color concentrated base dispersion is a concentrated mixture of all of the pigments, colors, plasticizers and co-solvents used in a coating mixture. The coating mixture is formed by adding from about 60 to about 95, preferably from about 75 to about 90, percent by weight of the mixture of a zein film-forming solution and from about 5 to about 40, preferably from about 10 to about 25, percent by weight of the mixture of the color concentrated base dispersion.

The zein film-forming solution contains about 5 to about 30, preferably from about 10 to about 20, percent by weight zein and from about 70 to about 95, preferably from about 80 to about 90, percent by weight of a lower alkanol solvent. The lower alkanol solvent of the zein film-forming solution is preferably the same lower alkanol as in the color concentrated base dispersion. A small amount of from about 0.1 to about 5, preferably from about 0.5 to 2, percent by weight of the zein film-forming solution of water can be added to facilitate dissolution of the zein.

The coating mixture may be used to dip-coat, spray-coat or otherwise coat edible or ingestible materials to prepare pharmaceutically elegant medicinal, pharmaceutical, food or other tablets. It is preferred to spray the coating mixture onto the base tablets. Spray-coating is, of course, well-known and any suitable spray-coating technique may be used to apply the film coating mixture to the tablets. For example, the film coating mixture may be sprayed onto the base tablets in accordance with the techniques discussed in "Influence of Certain Factors on the Coating of a Medicinal Agent on Core Tablets," Seidler et al., *Journal of Pharmaceutical Sciences*, Vol. 57, No. 6, pages 1007–1010 (1968).

The invention is additionally illustrated in connection with the following examples which are to be considered as illustrative of the present invention. It should be understood, however, that the invention is not limited to the specific details of the Examples.

EXAMPLE I

A white colored, concentrated base dispersion is made from the following ingredients:

|  | Parts by Weight |
|---|---|
| Ethyl Alcohol (95 % concentration U.S.P.) | 7.27 |
| Water, U.S.P. | 21.80 |
| Polyvinylpyrrolidone | 3.61 |
| Titanium Dioxide, U.S.P. | 36.40 |
| Polyethylene Glycol 4,000 | 18.20 |
| Glycerin, U.S.P. | 1.82 |
| Oleic acid | 10.90 |
|  | 100.00 |

The ethyl alcohol and water are premixed and the polyvinylpyrrolidone is added with mild agitation until dissolved. Then, the titanium dioxide is added under vigorous agitation until well dispersed. The polyethylene glycol, glycerin and oleic acid are then each individually added and mixed until dissolved or uniformly dispersed.

The color concentrated base dispersion may be formed from the same ingredients added in a different order.

EXAMPLE II

An orange color concentrated base dispersion is formed by dissolving 0.800 parts by weight of FD&C Yellow No. 6 dye in 6.660 parts of water. The resulting solution is added to 92.540 parts by weight of the base of Example I to form 100 parts by weight of an orange color concentrated base dispersion.

EXAMPLE III

A zein film-forming solution is prepared by dissolving 13.0 parts by weight of zein in 72.0 parts by weight of ethyl alcohol (95 percent concentration, U.S.P.).

The film-forming solution is added to 15.0 parts by weight of the orange color concentrated base of Example II.

The resulting coating mixture is sprayed onto vitamin tablets rotating in a stainless steel drum in a known manner using an air-drive powered spray system to form thin film (e.g., about 0.1 mm.) coatings of controlled disintegration time.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A color concentrated base dispersion having a long shelf life and adapted to be diluted with a zein solution to form a tablet coating mixture which color concentrated base dispersion consists essentially of:
    from about 5 to about 70 percent by weight of an edible pigment;
    up to about 12 percent by weight of an edible, water-soluble dye;
    from about 5 to about 50 percent by weight of at least one plasticizer for zein adapted to affect a desired disintegration time of the coating, said plasticizer being selected from the group consisting of polyethylene glycols, polypropylene glycols, glycerin, polyvinylpyrrolidone, hydroxyethyl cellulose, carboxymethylcellulose, hydroxypropyl cellulose ether, oleic acid, stearic acid, sorbitan monooleates, sorbitan monostearates, diglycerides from the glycerolysis of edible fats and fat-forming fatty acids, annato in oil, triacetin, tributyrin and mixtures thereof; and
    from about 25 to about 60 percent by weight of a co-solvent mixture of from about 20 to about 95 percent by weight of the co-solvent mixture of water and from about 5 to about 80 percent by weight of the co-solvent mixture of a lower alkanol having up to about 8 carbon atoms.

2. The color concentrated base dispersion of claim 1 wherein said plasticizer is a mixture of a water-soluble plasticizer and a water-insoluble plasticizer.

3. The color concentrated base dispersion of claim 2 wherein said water-soluble plasticizer is polyethylene glycol having a molecular weight of up to about 20,000 and said water-insoluble plasticizer is oleic acid.

4. The color concentrated base dispersion of claim 1 further containing a minor amount of a dispersing agent for the pigment.

5. The color concentrated base dispersion of claim 1 further containing a minor amount of a solubilizing agent for the dye.

6. The color concentrated base dispersion of claim 4 wherein said pigment is titanium dioxide and said dispersing agent is polyvinylpyrrolidone.

7. A color concentrated base dispersion having a long shelf life and adapted to be diluted with a zein solution to form a tablet coating mixture which color concentrated base dispersion consists essentially of:
    from about 15 to about 50 percent by weight of titanium dioxide as a pigment;
    from about 1 to about 30 percent by weight of polyvinylpyrrolidone as a dispersing agent for the titanium dioxide pigment;
    from about 0.2 to about 10 percent by weight of a water-soluble dye;
    from about 0.2 to about 12 percent by weight of glycerin as a solubilizing agent for the dye;
    from about 20 to about 40 percent by weight of a mixture of polyethylene glycol having a molecular weight of from about 1,000 to about 10,000 and oleic acid as a plasticizer for zein;

the ratio of polyethylene glycol to oleic acid adapted to control the disintegration time of the coating;

from about 30 to about 50 percent of the dispersion of a co-solvent mixture of from about 40 to about 85 percent by weight of the co-solvent mixture of water and from about 15 to about 60 percent by weight of the co-solvent mixture of a $C_1$ to $C_3$ alkanol.

8. The method of forming a coating mixture adapted to coat tablets with coatings of a particular disintegration time which comprises:

providing a film-forming solution of from about 5 to about 30 percent by weight of zein in from about 70 to about 95 percent by weight of a lower alkanol solvent having up to about 8 carbon atoms; and mixing from about 60 to about 95 percent by weight of the total mixture of the said film-forming solution with from about 5 to about 40 percent by weight of the color concentrated base dispersion of claim 1 to form a coating mixture.

9. The method of claim 8 comprising forming said coating mixture by mixing from about 75 to about 90 percent by weight of the said film-forming solution and from about 10 to about 25 percent by weight of the color concentrated base dispersion of claim 1.

10. The method of forming a coating mixture adapted to coat tablets with coatings of a particular disintegration time which comprises:

providing a film-forming solution of from about 10 to about 20 percent zein and from about 80 to about 90 percent by weight of the solution of a co-solvent mixture, said co-solvent mixture consisting essentially of from about 0.5 to about 2 percent by weight of water and from about 98 to about 99.5 percent by weight of a $C_1$ to $C_3$ alkanol; and;

mixing from about 75 to about 90 percent by weight of the total mixture of the said film-forming solution with from about 10 to about 25 percent by weight of the color concentrated base dispersion of claim 7.

* * * * *